United States Patent [19]

Seino

[11] Patent Number: 4,748,552
[45] Date of Patent: May 31, 1988

[54] SEQUENCE CONTROL SYSTEM
[75] Inventor: Tatsumi Seino, Fukushima, Japan
[73] Assignee: Goro Kikuchi, Tokyo, Japan
[21] Appl. No.: 867,681
[22] Filed: May 28, 1986
[51] Int. Cl.$^4$ .................. G06F 15/46; G05B 19/42
[52] U.S. Cl. .................................. 364/140; 364/146; 364/900; 364/193
[58] Field of Search .................. 364/191–193, 364/140–147, 900 MS File

[56] References Cited
U.S. PATENT DOCUMENTS

| 4,348,623 | 9/1982 | Kobayashi et al. | 364/193 X |
| 4,425,630 | 1/1984 | Yomogida et al. | 364/146 X |
| 4,481,591 | 11/1984 | Spongh | 364/193 X |
| 4,484,294 | 11/1984 | Noss | 364/193 X |
| 4,570,385 | 2/1986 | Richter et al. | 364/193 X |

Primary Examiner—Joseph Ruggiero
Attorney, Agent, or Firm—Wenderoth, Lind & Ponack

[57] ABSTRACT

A directly taught sequence control system performs the steps of storing as a pattern information and in order of steps of operation of a load so as to superpose data one on another, one information block of real time data which includes a binary load control signal and all of pulse signals fed back in a parallel manner from detectors on the load to be controlled in accordance with the load control signal every step of operation of the load whereby a successive sequence program is formed to control the operation of the load; and successively renewing the sequence program by comparing the next real time data fed back on operation of the load while the sequence program is reproduced with the reference data which includes the data fed back from the load to be stored whereby a programing operation on a desk is unnecessary.

6 Claims, 6 Drawing Sheets

SEQUENCE CONTROL SYSTEM

BACKGROUND OF THE INVENTION

A well known prior sequence controller is adapted to reproduce an operation of an automatic production line in a factory in a repeated and sequential manner in accordance with a program of sequential steps of operation of a load which is previously designed by a programmer. Since a mode of description is more simplified than that required by a computer, an operation of programming is enabled by some acquirement of knowledge and as a result, a full-time programmer is not required to be employed nor must the preparation of program be ordered from an outside programmer.

Accordingly, since the program can be simply corrected in accordance with the situation of the factory, the sequence controller has come into wide use lately, and its construction ranges from a logic circuit using relays to an application of microprocessors.

A program utilizing such a sequence controller is arranged such that a relay sequence circuit is first designed and a sequence program of a descriptive mode peculiar to the sequence controller to be used in accordance with the relay sequence circuit is sequentially input into a memory means by means of an input means such as key switches so as to be stored therein.

Although such a sequence controller can be used in a simple manner as noted above, an operator is required to master logic descriptive marks such as AND or OR to form the relay sequence circuit and the way to use it. Also, the descriptive marks have variations according to the controller developers or manufacturers. Thus, without limiting the kind of sequence controller to be introduced, an operator has to master a way of programming which may be different from that of the previous programming everytime a new kind of sequence controller is introduced.

This is a burden newly applied to the operator and especially in case that an article (load) to be controlled is of simple construction, troublesome work is required relative to a simple control object, which is not acceptable to an operator.

In order to avoid such drawbacks, there is proposed such a system that one step of the program is formed by factors including:

(1) designation of output ports which output operation signals to a load connected thereto;

(2) designation of input ports to which detectors on the load are connected; and (3) designation of time of a timer to set a time for which the output ports are opened.

A successive control program is then prepared by sequentially superposing the steps of program.

Although the sequence controller using such a simple program system has no problem in the case where the the accuracy of operation of a drive system for the means to be controlled is managed by itself or in the case that a binary ON or OFF operation for use with solenoid valves or air cylinders occurs. A time for which the steps of driving the article to be controlled are maintained is disadvantageously determined by the value previously set by the timer. For example, if the article to be controlled is a rotary drive using an electric motor, such that the control of a rotary movement is an object of the article to be controlled, a time from its rotation to its stop is sometimes different from that calculated in view of friction and inertia peculiar to the load. Although a means to detect a stop position, where a stop signal is fed back in some of the rotary drive systems have been introduced, the position where the detecting means is located has to be determined in view of the friction and the inertia.

Thus, in any of the prior art systems, the correction of errors practically requires the driving of the load.

SUMMARY OF THE INVENTION

Accordingly, it is a principal object of the invention is to provide a sequence control system adapted to make it unnecessary to first prepare a program on a desk.

It is another object of the invention to provide a sequence control system adapted to precisely control an operation of a load.

It is further object of the invention to provide a sequence control system adapted to teach all of the steps of a sequence of operations by simply inputting definite numerical data to the system.

It is further object of the invention to provide a sequence control system adapted to easily add or delete a step or steps of a sequence of operations.

It is further object of the invention to provide a sequence control system adapted to easily return a load to its original position.

In accordance with the present invention, there is provided a sequence control system comprising:

an output port means including a plurality of output ports to maintain and send out a binary control signal during each operation step of an article to be controlled, said article being connected to said output ports, and output port selector means for manually selecting each of said output ports;

an input port means including a plurality of input ports each receiving a binary detected signal fed back from a detector means provided on mechanical gearing of said article to be controlled;

an output data memory means for storing a condition of each of said output ports in each of said operation steps of said article to be controlled in order of said operation steps;

an input data memory means for storing a condition of said binary detected signal fed back to said input port means on the condition of establishment of each of said operation steps;

a memory management means for controlling said output and input memory means and for designating a memory address for each of said output and input memory means;

a timer mean for storing both real time calculation data and manual setting time data as step maintenance time data in said input memory means in both a teaching and a storing mode;

and a data comparator means for comparing various information stored in said input data memory means during both sides teaching and storing modes with the feed back signal data momentarily supplied as the real time data to said input port means and with real time data from said timer means so as to read out and select said memory addresses of said output and input data memory means by said memory management means when said compared data are consistent with each other and to supply an instruction signal to said output port means for sending out the read out data from said output data memory means whereby a sequence control is directly taught.

BRIEF DESCRIPTION OF THE DRAWINGS

The above and other objects and features of the invention will be apparent from the description of an embodiment taken along with the accompanying drawings in which.

DETAILED DESCRIPTION OF PREFERRED EMBODIMENT

Figure 1:
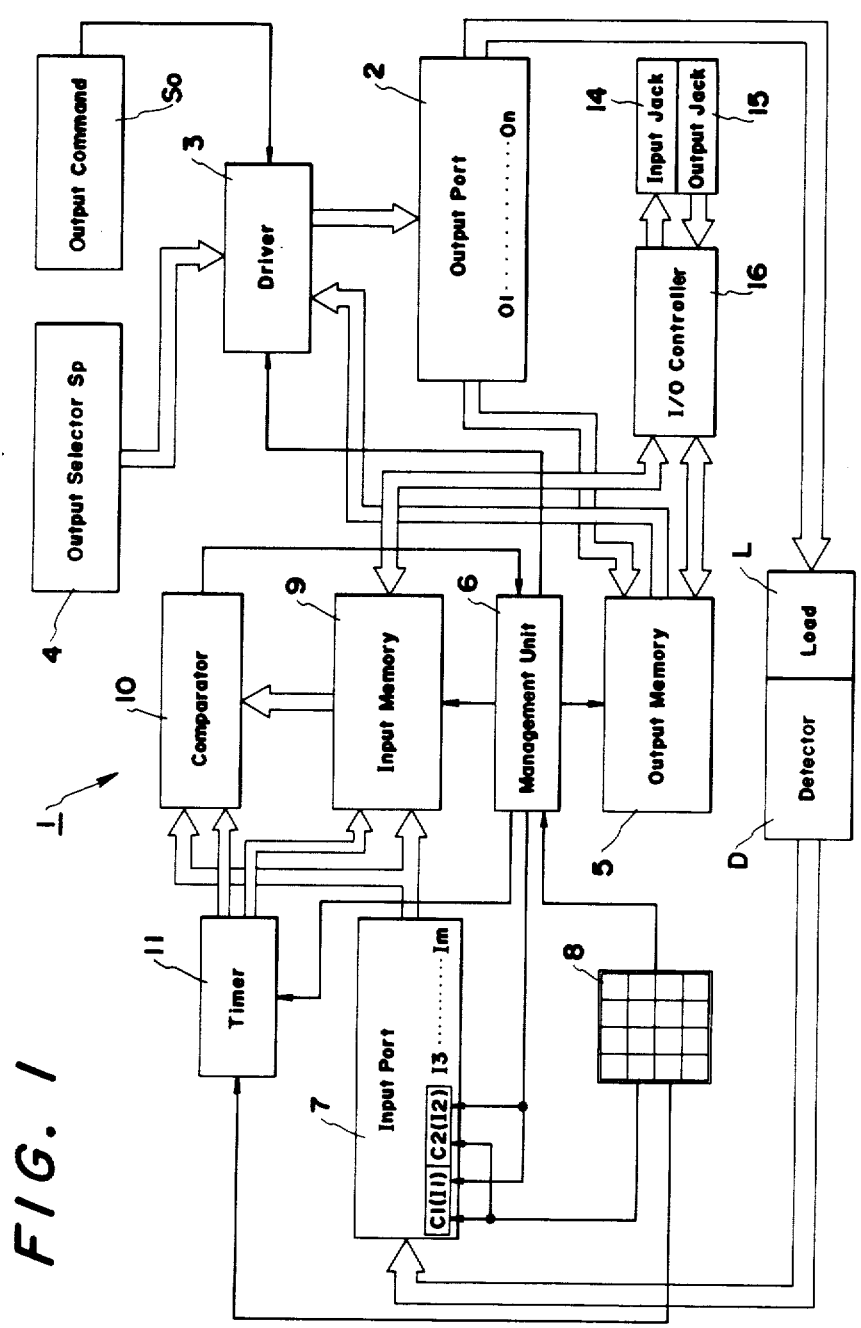
FIG. 1 is a block diagram of a sequence control system constructed in accordance with one embodiment of the present invention.

Referring now to FIG. 1, there is shown a sequence controller 1 constructed in accordance with one embodiment of the present invention. The sequence controller 1 comprises an output port means 2 including a plurality of output ports of $O_1$ through $O_n$ for outputting load control output signals to a controlled article (load L) on which a detector means D is disposed on its mecahnical gearing to detect positions (i.e.—conditions) of the load, an output port driver means for driving the output port means, an individual output port selector means 4 for providing selective information of the output ports of $O_1$ through $O_n$ of the output port means 2 to the output port drive means 3, an output data memory means 5 for storing the condition of opening and closing all of the output ports $O_1$ through $O_n$ of the output port means 2, a memory management means 6 for controlling the memory addresses of the output data memory means 5. The sequence controller 1 also comprises an input port means 7 including a plurality of input ports of $I_1$ through $I_m$ for receiving an output detected by the detector means D on the controlled article, pulse counting means $C_1$ and $C_2$ including the particular input ports of the input port means 7 that are the input ports $I_1$ and $I_2$, for example, the pulse counting means each being able to initially set its count by a switch group 8 including a plurality of numerical input switches, an input data memory means 9 for storing the feed back signals introduced into the input port means 7 in a pattern manner and having memory addresses controlled by the memory management means 6. The sequence controller 1 also comprises a data comparator means 10 for comparing various information stored in the input data memory means 9 with the feed back signal data momentarily supplied as the real time data to the input port means 7 for providing to an instruction signal to the memory management means 6 for reading out the stored content of the next step of the output data memory means 5 and the input data memory means 9 and for resetting and starting again the pulse counting means $C_1$ and $C_2$, and a timer means 11 which is to be initially set by the switch group 8 for controlling the time for which the output port means is opened and closed. The output data memory means 5, the memory management means 6, the pulse counting means $C_1$ and $C_2$, the input data memory means 9, the data comparator means 10 and the timer means 11 may be formed of firm-ware by properly combining microprocessor elements and memory elements, for example.

Figure 5:
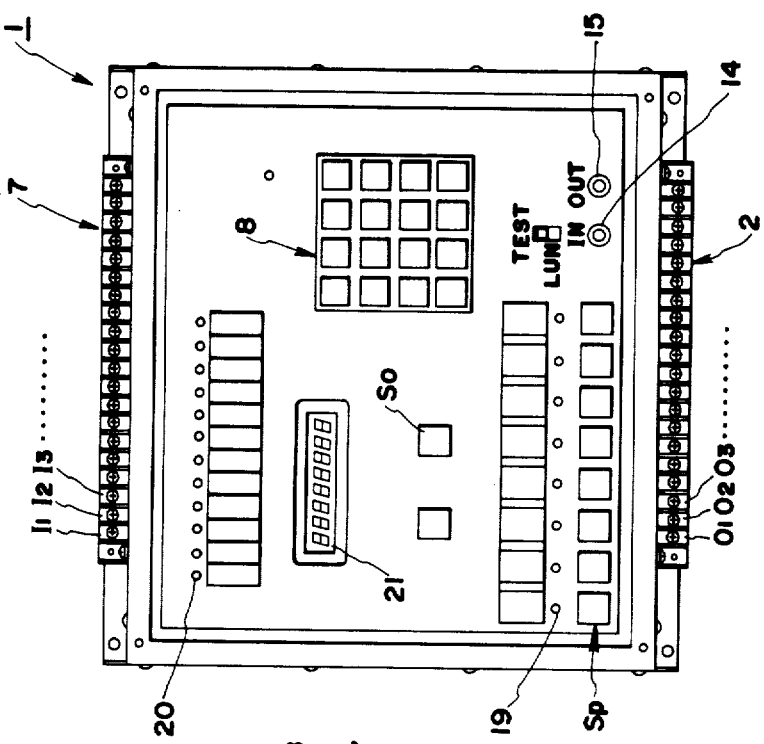
FIG. 5 is a front view of an external appearance of the sequence controller of the present invention.
Figure 4:
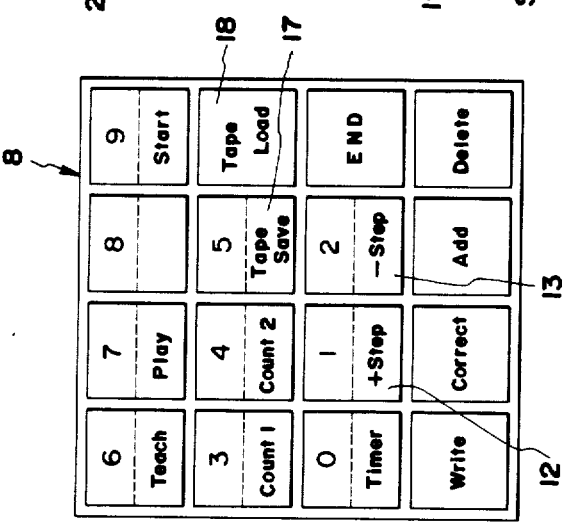
FIG. 4 is an enlarged view of a switch group.
Figure 6C:
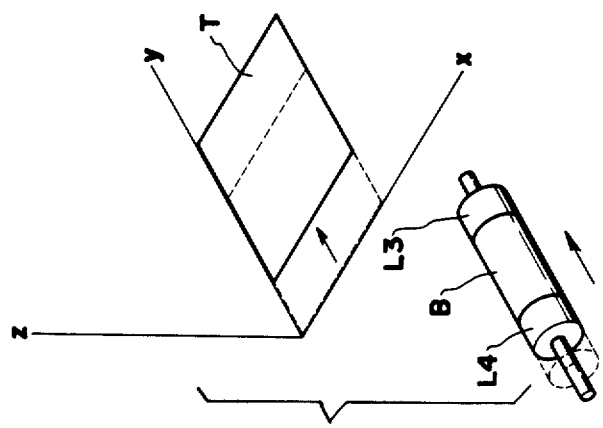
FIGS. 6(A)–6(F) illustrate one example of a sequence program formed by a direct teaching sequence control system of the present invention.
Figure 6B:
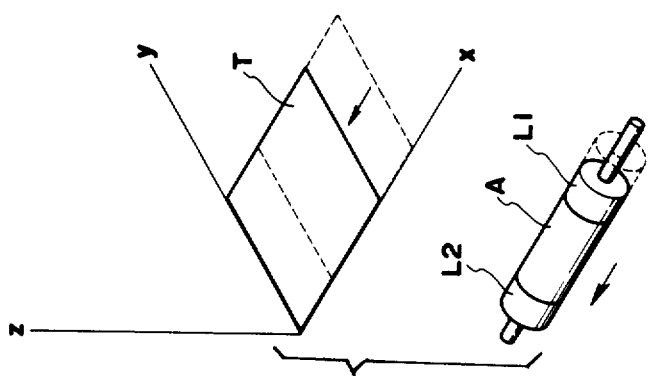
Figure 6A:
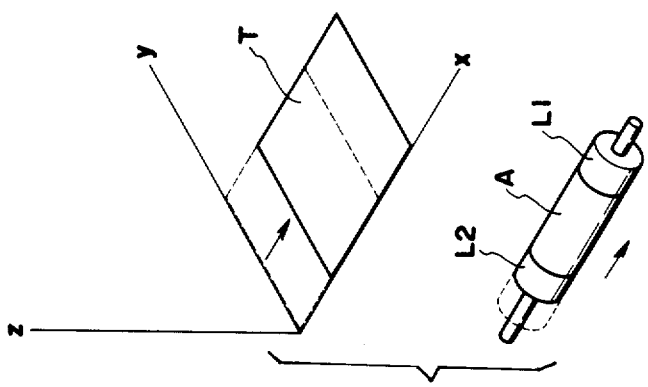
Figure 6F:
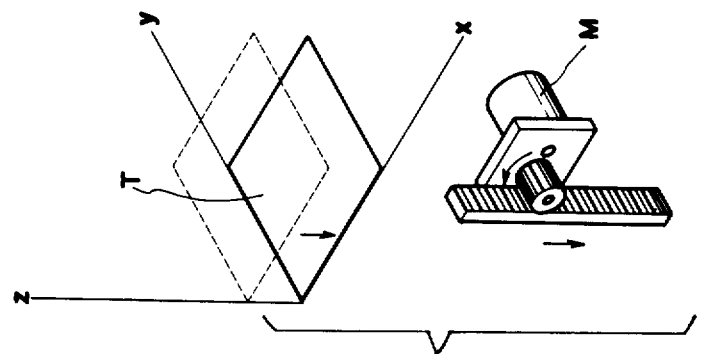
Figure 6E:
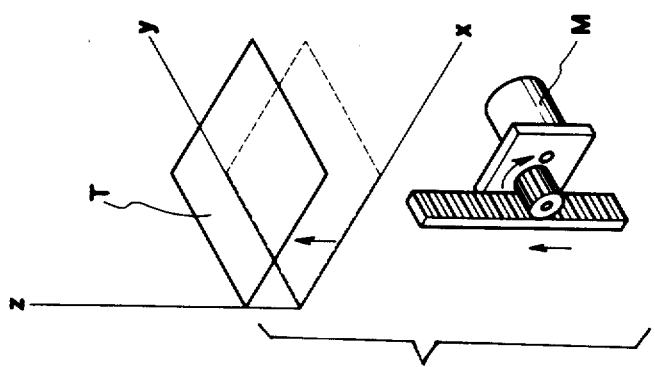
Figure 6D:
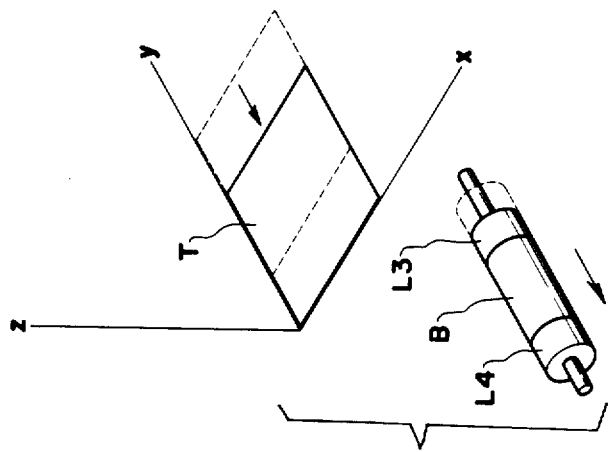

The sequence controller 1 of the present invention further comprises a step forwarding key 12 and a step reversing key 13 as indicated in the switch group 8 in FIG. 4, which serve to manually forwardly or reversely move in a step by step manner through each step of the sequence program prepared by the teaching mode. As shown in FIG. 5, the sequence controller 1 also comprises an output jack 15 to output to an external storage means, such as a magnetic tape recorder a successive sequence program prepared by the teaching mode and stored by the output and input data memory means 5 and 9, and an input jack 14 to again read the program stored externally into the output and input data memory means 5 and 9. The output and input jacks 15 and 14 are connected through an input-output control 16 to the output and input data memory means 5 and 9 and are operated by a save key 17 and a load key 18. The sequence controller 1 also comprises a lamp group 19 to indicate the condition of the output port means 2, a lamp group 20 to indicate the condition of the input port means 7 and a figure indicator 21 to indicate the set data of the pulse counting means $C_1$ and $C_2$ and the timer means 11.

The operations of the teaching and reproducing modes of the sequence controller of the invention are described below.

Figure 2:
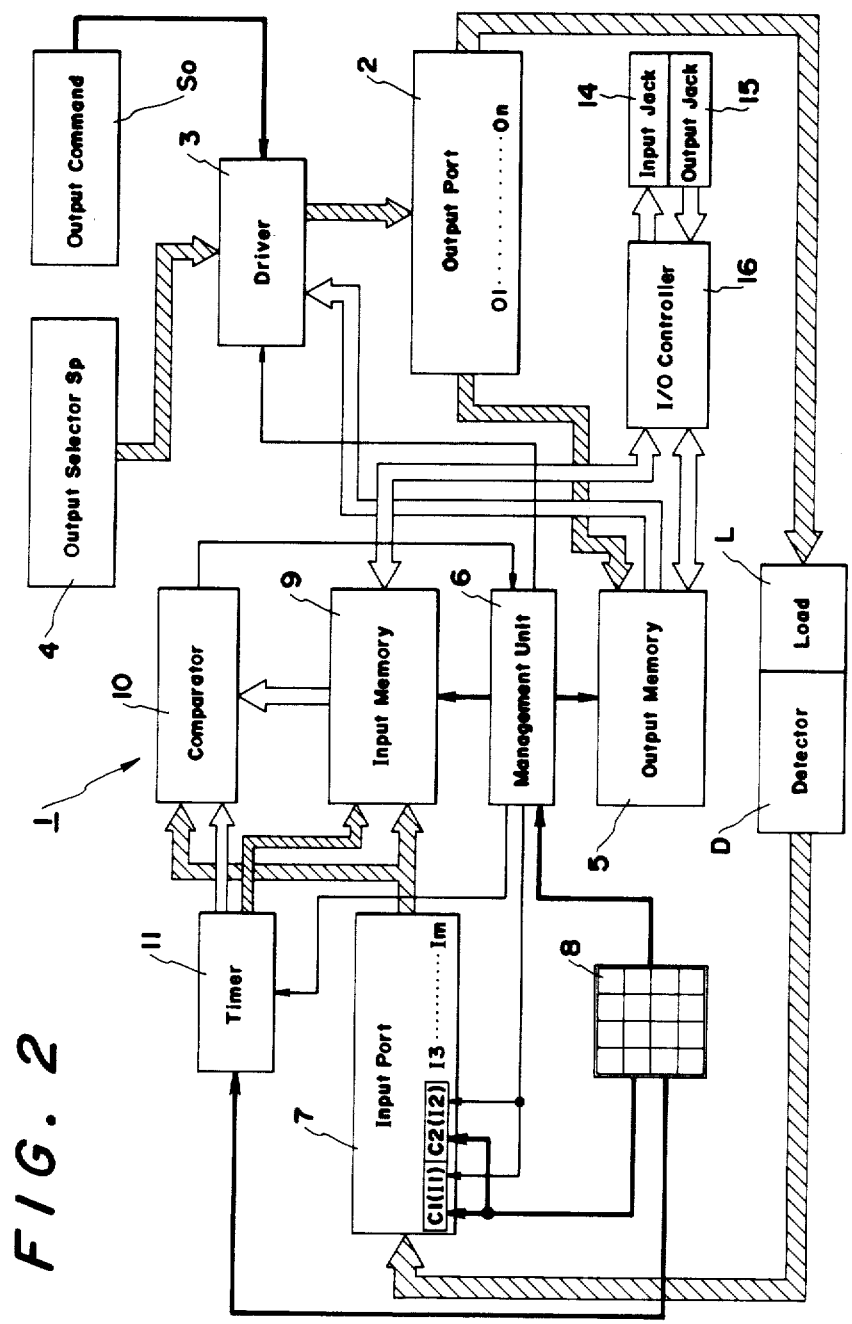
FIG. 2 is a block diagram similar to that of FIG. 1, but showing its operation in a teaching mode.

Referring to FIG. 2 which shows the operation of the teaching mode of the sequence controller.

(1) After one or more of the output ports $O_1$ through $O_n$ have been selected by operating the output port selector means 4 which may be formed of individual switch group Sp as shown in FIG. 5, a manual output switch So is turned on.

(II) A selective signal from the output port selector means 4 is supplied to the output port driver means 3 to activate the selected output port.

(III) The load L (the controlled article) connected to the activated output port is operated and simultaneously the detector means D provided on the load L and connected to one of the input ports $I_1$ through Im of the input port means 7 sends out the detected signal to the predetermined input port.

(IV) When the load L reaches the predetermined condition, the output selector So is turned off to nonactivate all the output ports $O_1$ through On so as to stop all portions of the load L.

(V) In order to maintain the predetermined condition of the load L, the reference time data on the operation of the timer means 11 can be directly and numerically set by using operation input means such as the switch group 8 as shown in FIG. 4. The time information can be normally treated as a binary information in the same manner as the feed back signal.

(VI) After the content of the successive step operation information is acknowledged, a writing instruction signal is provided to the memory management means 6 connected to the operation input means such as the switch group 8.

(VII) The opened and closed condition of the output ports $O_1$ through On of the output port means 2 is contained in the predetermined area (address) of the output data memory means 5 while the feed back signal introduced into the input port means 7 is contained in the predetermined area (address) of the input data memory means 9. Thus, the teaching (storing) operation of the first step has finished and the teaching input of the second and further steps are ready.

(VIII) After the teaching operation of all the steps are completed, a teaching finishing signal is provided by operating the switch group 8 and the memory management means 6 detects the final address to automatically select the first address of the ready condition for reproduction.

In case the detector means D on the operated load L is of such a style that a successive pulse signal from a rotary pulse generator, for example, is produced, the detector means D is connected to the particular input port $I_1$ and $I_2$ to which the pulse counting means $C_1$ and $C_2$ are connected. Thus, it will be noted that the counting value is in a binary code, which enables the counting value to be treated together with the feed back input signal in the same manner as the output signal from the timer means 11.

Of course, it should be noted that since the sequence controller of the invention has an editorial function of correction of, addition to and deletion from the sequence program stored by teaching in the same manner as a conventional sequence controller has, the sequence program can be edited by operating the switch group 8 as shown in FIG. 4 or other switches if necessary.

Figure 3:
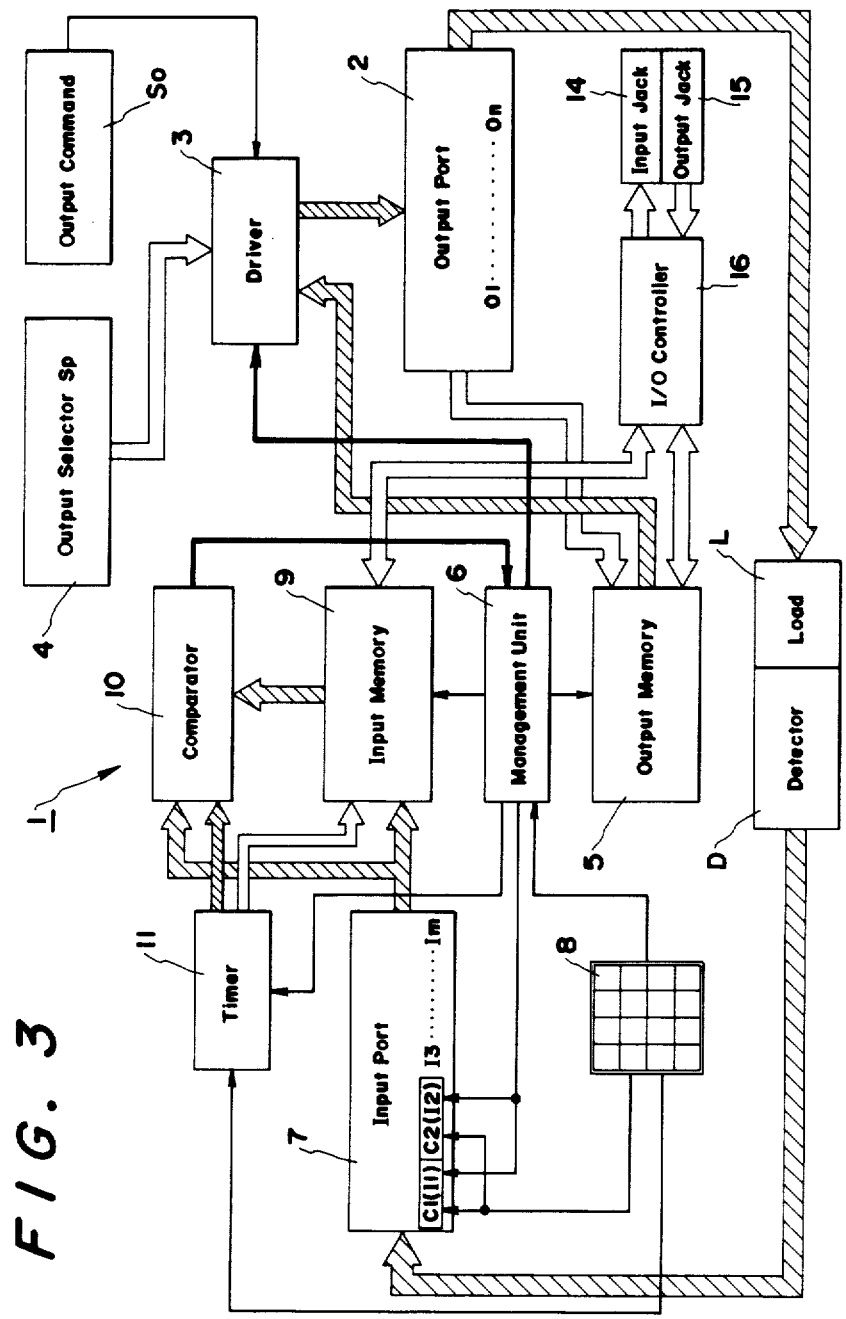
FIG. 3 is a block diagram similar to those of FIGS. 1 and 2, but showing its operation in a reproducing mode.

Referring to FIG. 3 in which shows the operation of the reproducing mode of the content (program) stored by the teaching mode.

(i) When the reproduction mode is selected by the operation of the switch group 8, the output data of one step is read out from the output data memory means 5 and supplied to the output port means 2. Thus, the predetermined load is driven and at the same time, the feed back signal data from the detector means D, stored in the input data memory means, is read out after one step has finished as is the time information data from the timer means 11, which are supplied to the data comparator means 10.

(ii) The real time signal fed back from the detector means D on the driven load and the real time counting data from the timer means 11 are supplied to the data comparator means 10.

(iii) The data comparator means 10 is operated so that the stored data read out from the input data memory means 9 is compared with the real time data input from the input port means 7 in their pattern to send out the step reproduction finishing signal (or reproduction step renewal signal) to the memory management means 6 when all the elements completely coincide with each other, which causes the next step to be reproduced.

(iv) When the final step to be reproduced has ended, the memory management means 6 returns the next reproduction selective address to the original step so as to accomplish to repeat the successive taught content.

An example of the sequence program produced and reproduced by the aforementioned procedures is briefly formed as shown in FIGS. 6(A)–6(F). In this example, the controlled article is a three-dimensional movable table and the number of an electric load for moving the controlled article is six as indicated by L1 through L6. The loads L1 and L2 are a pair of input valves for forwardly and reversely operating an air cylinder A mounted on the table T, along an X-axis. The loads L3 and L4 are a pair of input valves for forwardly and reversely operating an air cylinder B along a Y-axis and the loads L5 and L6 are a pair of forward and reverse inputs for a geared motor M for forwardly and reversely moving the table along a Z-axis.

In step 1, the input valve L1 of the air cylinder A is turned on for 10 seconds until the table T is forwardly moved to the predetermined forward position along the X-axis.

In step 2, the input valve L2 of the air cylinder A is turned on until the table T is reversely moved along the X-axis to the predetermined reverse position.

In step 3, the input valve L3 of the air cylinder B is turned on for 15 seconds until the table T is forwardly moved to the predetermined forward position along the X-axis.

In step 4, the input valve L4 of the air cylinder B is turned on until the table T is reversely moved along the Y-axis to the predetermined reverse position.

In step 5, the forward input L5 for the geared motor M is turned on while it forwardly rotates four revolutions to move the table T along the Z-axis to the predetermined forward position.

In step 6, the forward input L6 for the geared motor M is turned on while it forwardly rotates four revolutions to move the table T along the Z-axis to the predetermined reverse position.

In this manner, various steps are accomplished in the same manner.

While a preferred embodiment have been described and illustrated with reference to the accompanying drawings, it will be understood that it is by way of example, and that various changes and modifications may be made wihtout departing from the spirit and scope of the invention, which is intended to be defined only by the appended claims.

What is claimed is:

1. A sequence control system comprising:
   an output port means including a plurality of output ports to maintain and send out a binary control signal during each operation step of an article to be controlled, said article being connected to said output ports, and an output port selector means for manually selecting each of said output ports;
   an input port means including a plurality of input ports each receiving a binary detected signal fed back from a detector means provided on mechanical gearing of said article to be controlled;
   an output data memory means for storing a condition of each of said output ports in each of said operation steps of said article to be controlled in order to said operation steps;
   an input data memory means for storing a condition of said binary detected signal fed back to said input port means on the condition of establishment of each of said operation steps;
   a memory management means for controlling said output and input memory means and for designating a memory address for each of said output and input memory means;
   a timer means for storing both real time calculation data and manual setting time data as step maintenance time data in said input memory means in both a teaching and a storing mode;
   and a data comparator means for comparing various information stored in said input data memory means during both said teaching and storing modes with the feed back signal data momentarily supplied as the real time data to said input port means and with real time data from said timer means so as to read out and select said memory addresses of said output and input data memory means by said memory management means when said compared data are consistent with each other and to supply to an instruction signal to said output port means for sending out the read out data from said output data memory means whereby a sequence control is directly taught.

2. A sequence control system as set forth in claim 1, wherein at least one of said input ports of said input port means comprises a pulse counting means for manually presetting a predetermined value.

3. A sequence control system as set forth in claim 1, further comprising an output condition indicating means corresponding to said output ports of said output port means and an input condition indicating means corresponding to said input ports of said input port means.

4. A sequence control system as set forth in claim 3, further comprising a manual output switch means for opening and closing all of said output ports of said output port means while said output condition indicating means is in an operating condition.

5. A sequence control system as set forth in claim 1, further comprising a step movement instruction means for manually entering forward and reverse move steps of a sequence program prepared during said teaching mode.

6. A sequence control system as set forth in claim 1, further comprising a program output means for outputting said successive sequence program prepared during said teaching mode so as to store it in an external memory means and a program input means for again reading said sequence program stored in said external memory means.

* * * * *